US007041732B2

United States Patent
Bolton et al.

(10) Patent No.: US 7,041,732 B2
(45) Date of Patent: *May 9, 2006

(54) COMPATIBLE BLEND OF POLYCARBONATE WITH VINYL (CO)POLYMER

(75) Inventors: Daniel H. Bolton, Aliquippa, PA (US); Pierre Moulinie, Imperial, PA (US); David M. Derikart, Tarentum, PA (US); Nicanor Kohncke, Pittsburgh, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 71 days.

This patent is subject to a terminal disclaimer.

(21) Appl. No.: 10/730,518

(22) Filed: Dec. 8, 2003

(65) Prior Publication Data
US 2004/0116624 A1 Jun. 17, 2004

Related U.S. Application Data

(63) Continuation of application No. 10/053,261, filed on Jan. 18, 2002, now Pat. No. 6,670,420, which is a continuation-in-part of application No. 09/568,385, filed on May 10, 2000, now abandoned.

(51) Int. Cl.
*C08L 69/00* (2006.01)

(52) U.S. Cl. .......................... 525/67; 525/133; 525/146; 525/148

(58) Field of Classification Search .................. 525/67, 525/133, 146, 148
See application file for complete search history.

(56) References Cited

U.S. PATENT DOCUMENTS 3,856,886 A 12/1974 Margotte et al. ............ 260/873

(Continued)

FOREIGN PATENT DOCUMENTS

| JP | 01315425 | * | 12/1989 |
| JP | 07033929 | * | 2/1995 |

OTHER PUBLICATIONS

Li; "Miscibility of Polymer Blends of Poly(styrene-co-hydroxystyrene) with Bisphenol A Polycarbonate"; Journal of Applied Polymer Science vol. 74 (1999) pp. 639-646.*

(Continued)

*Primary Examiner*—David J. Buttner
(74) *Attorney, Agent, or Firm*—Joseph C. Gil; Aron Preis

(57) ABSTRACT

A compatible blend of polycarbonate resin with a vinyl (co)polymer blending partner is disclosed. The preparation of inventive blend comprise reactive blending of polycarbonate, a vinyl (co)polymer and a novel compatibilizer in the presence of a transesterification catalyst and under conditions of time and temperature designed to promote transesterification. The compatibilizer is the polymerized reaction product of at least one vinyl monomer that contains no hydroxy groups and a hydroxyl containing monomer conforming to (I)

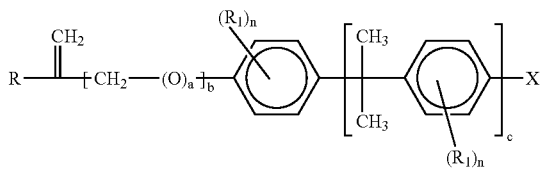

where R denotes H or $C_1$–$C_4$ alkyl, $R_1$ denotes H, Cl, Br, $C_1$–$C_4$ alkyl, cyclohexyl, or $C_1$–$C_4$ alkoxy, a is 0 or 1, b is 0 or 1, c is 0 or 1, n is an integer of 0 to 4 and X is an OH group. The compatible blends of the invention are characterized by their improved properties.

8 Claims, 2 Drawing Sheets

NaOH etched Blend of 60% polycarbonate and 40% SAN at 300X viewed by SEM

U.S. PATENT DOCUMENTS

| | | | | |
|---|---|---|---|---|
| 3,991,009 A | 11/1976 | Margotte et al. | .......... | 260/42.18 |
| 4,874,816 A | 10/1989 | Dujardin et al. | ............ | 525/146 |
| 5,266,635 A | 11/1993 | Wilkey | ........................ | 525/67 |
| 6,670,420 B1 * | 12/2003 | Bolton et al. | .................. | 525/67 |

OTHER PUBLICATIONS

Polymer Eng. Sci., vol. 31, Jul. 1991, pp. 929-935, M. Xanthos & S.S. Dagli, Compatibilization Of Polymer Blends by Reactive Processing.

Database CA [Online] Chemical Abstracts Service, Columbus, Ohio, US: retrieved from STN Database accession No. 123:171437/DN, HCAPLUS XP002185867 * abstract * IT 24936-68-3 * & JP 07 033929 A (Denki Kagaku Kogyo KK) Feb. 3, 1995.

Patent Abstracts of Japan vol. 014, No. 115 (c-0696), Mar. 5, 1990 & JP 01 315425 A (Tosoh Corp), Dec. 20, 1989 *abstract *.

Patent Abstracts of Japan, vol. 1998, No. 02, Jan. 30, 1998 & JP 09 279004 A (Asahi Chem Ind Co Ltd), Oct. 28, 1997 * abstract *.

* cited by examiner

NaOH etched Blend of 60% polycarbonate and 40% SAN at 300X viewed by SEM

NaOH etched Blend of 60% polycarbonate and 40% SAN with the addition of 4 wt% of a hydroxyl containing (2 mol% -OH) SAN terpolymer at 300X viewed by SEM

COMPATIBLE BLEND OF POLYCARBONATE WITH VINYL (CO)POLYMER

This application is a Continuation of Ser. No. 10/053,261, filed Jan. 18, 2002, now U.S. Pat. No. 6,670,420.

This application is a Continuation-In-Part of U.S. Ser. No. 09/568,385, filed May 10, 2000, now abandoned.

The invention is directed to thermoplastic molding compositions and more particularly to a compatible blend containing polycarbonate and a vinyl (co)polymer.

SUMMARY OF THE INVENTION

A compatible blend of polycarbonate resin with a vinyl (co)polymer blending partner is disclosed. The preparation of inventive blend comprises reactive blending of polycarbonate, a vinyl (co)polymer and a novel compatibilizer in the presence of a transesterification catalyst and under conditions of time and temperature designed to promote transesterification. The compatibilizer is the polymerized reaction product of at least one vinyl monomer that contains no hydroxy groups and a hydroxyl containing monomer conforming to (I)

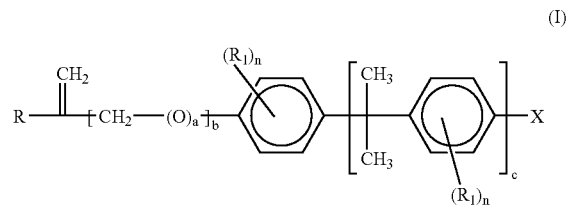

(I)

where R denotes H or $C_1$–$C_4$ alkyl, $R_1$ denotes H, Cl, Br, $C_1$–$C_4$ alkyl, cyclohexyl, or $C_1$–$C_4$ alkoxy, a is 0 or 1, b is 0 or 1, c is 0 or 1, n is an integer of 0 to 4 and X is an OH group. The compatible blends of the invention are characterized by their improved properties.

BACKGROUND OF THE INVENTION

It has long been recognized that compatible heterogeneous resin blends having good properties are characterized by the presence of finely dispersed phase and resistance to phase separation. Various methods have been reported to successfully enhance compatibility (see Xanthos, M. and S. S. Dagli, *Compatibilization of Polymer Blends by Reactive Processing, in Polym. Eng. Sci.,* 1991, p. 929–35 and the articles cited there for an overview of the technology.) Reactive processing has long been recognized as means for attaining compatibility of polymeric blending partners. Enhancement of compatibility is known to be attained by forming copolymers, using reactive processing, such as graft or block copolymers with segments capable of specific interactions and/or chemical reactions with the blend components that would otherwise be incompatible. The review article referred to above points to continuous reactive processing, in particular, extrusion, as means to providing compatibilization of polymer blends through reactions during compounding. U.S. Pat. No. 3,856,886 disclosed thermoplastic graft copolymers wherein polymeric backbone contains aromatic hydroxy groups and where aromatic polycarbonate is grafted onto the backbone via the aromatic hydroxy groups. The disclosed graft copolymers are said to form blends with polycarbonate and/or with polymers of olefinically unsaturated monomers.

Graft polycarbonates in which the graft stock is a vinyl polymer which contains side chains that contain hydroxyphenyl groups, on which aromatic polycarbonate chains are condensed, have been disclosed in U.S. Pat. No. 3,991,009. These, together with graft polymer rubbers, form thermoplastic molding composition.

U.S. Pat. No. 4,874,816 disclosed a process for the production of vinyl copolymers with grafted-on polycarbonate chains. These grafts are prepared through the reaction of biphenols and phosgene in an interfacial process with hydroxyl containing vinyl polymers.

DETAILED DESCRIPTION OF THE INVENTION

Figure 1:
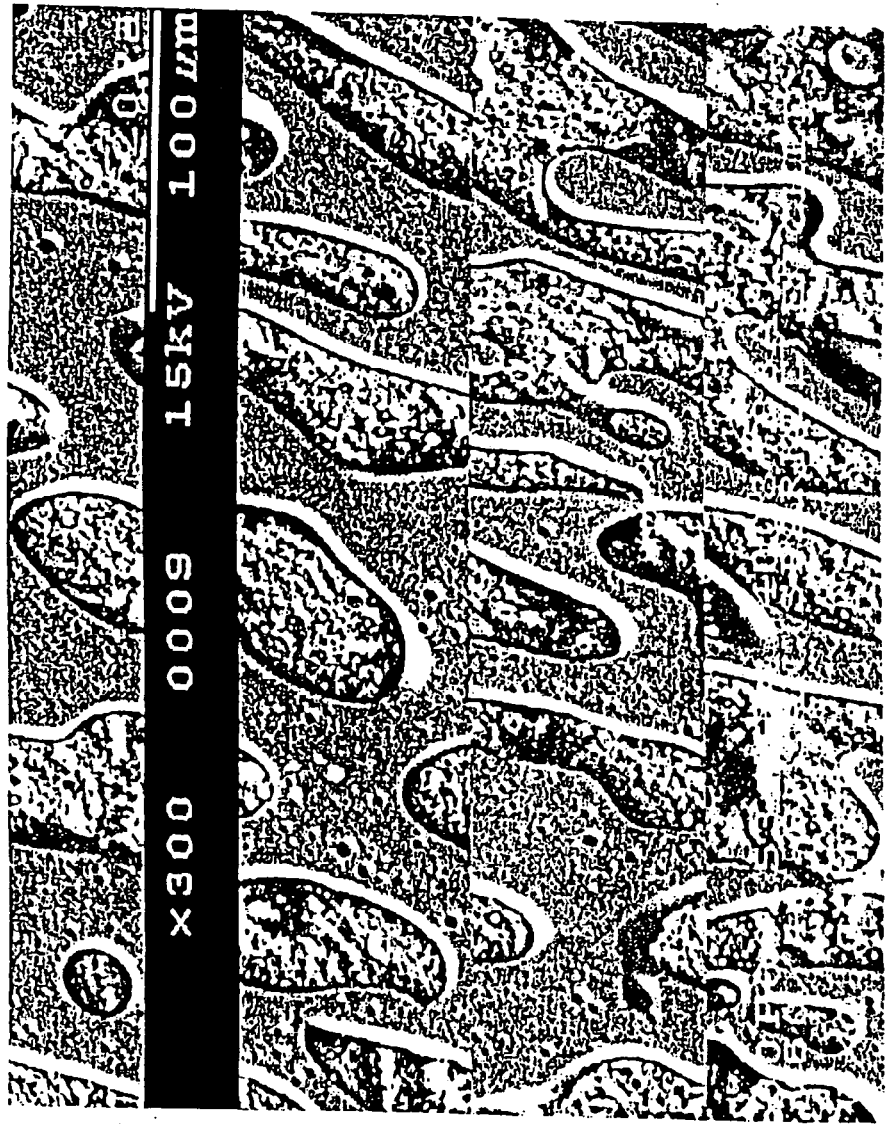
FIG. 1 is a scanning electron micrograph at 300 magnification of an incompatible blend containing 60% polycarbonate and 40% SAN prepared in a melt mixer without the compatibilizer of the present invention.

The present invention is directed to a thermoplastic molding composition that contains a compatibilized blend of polycarbonate and a vinyl (co)polymer. The blend contains a compatibilizer that is a hydroxyl-containing vinyl copolymer prepared by reacting in a conventional free-radical polymerization (i) at least one vinyl monomer that contains no hydroxy groups with (ii) 0.5 to 50, preferably 2 to 5, percent of a hydroxyl containing vinyl monomer conforming to (I)

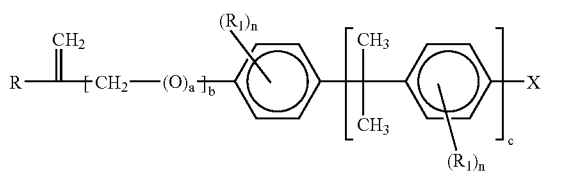

(I)

where R denotes H or $C_1$–$C_4$ alkyl, $R_1$ denotes H, Cl, Br, $C_1$–$C_4$ alkyl, cyclohexyl, or $C_1$–$C_4$ alkoxy, a is 0 or 1, preferably 0, b is 0 or 1, preferably 0, c is 0 or 1, preferably 0, n is an integer of 0 to 4 and X denotes OH, to form a polymerized compatibilizer.

The compatibilized blend of the invention contains about 1 to 99% polycarbonate, 1 to 99% of vinyl (co)polymer and 0.1 to 10% of the compatibilizer. Preferably the blend contains 10 to 90% polycarbonate, 10 to 90% vinyl (co) polymer and 1 to 5% compatibilizer, the percents being relative to the total weight of polycarbonate, vinyl (co) polymer and compatibilizer.

The compatibilizer is a copolymer having a number average molecular weight (Mn) of 5,000 to 80,000 as measured by size exclusion chromatography. Conventional initiators, preferably 2,2'-azobisisobutyronitrile (AIBN) may be used in the process for making the compatibilizer.

The preparation of the inventive blend entails reactively blending the compatibilizer with polycarbonate resin and with a vinyl (co)polymer, in the presence of a transesterification catalyst and under conditions designed to promote transesterification. The vinyl (co)polymer compatibilizer is characterized in that its structural formula includes at least one vinyl unit, preferably the vinyl unit corresponding to that of the vinyl monomer of (i) above.

Among the suitable hydroxyl-containing vinyl monomers to be reacted in the preparation of the compatibilizer, particular mention may be made of α-methyl-p-hydroxystyrene, p-hydroxystyrene, and p-isopropenyl-o-cresol.

Examples of vinyl monomers that are suitable as reactant (i) above include styrene, acrylonitrile, acrylate and olefin monomers.

In preparing the compatible blend of the invention, the compatibilizer is reactively blended with polycarbonate and a blending partner in the presence of a transesterification catalyst. The blending partner is vinyl (co)polymer resin, preferably a (co)polyolefin, (co)poly(meth)acrylate or (co)polystyrene. In a more preferred embodiment, the blending partner is characterized in that its structural formula includes at least one vinyl unit corresponding to that of the vinyl monomer of (i) above.

A catalyst suitable for reactively blending in accordance with the invention is any of the transesterification catalysts that are known in the art. The preferred catalysts include tetraphenylphosphonium benzoate, tetraphenylphosphonium acetate, tetrphenylphosphonium phenolate. Also included are tetrabutylammonium tetraphenylborate, tetramethylammonium tetraphenylborate, sodium tetraphenylborate, potassium tetraphenyl borate, lithium tetraphenylborate, tetramethylphosphonium tetraphenyl-borate, and tetraphenylphosphonium tetraphenylborate. The advantage of the preferred catalysts resides in that they decompose to form inactive species at the elevated process temperatures. This inactivation of the catalyst precludes the post-processing transesterification and, therefore, yield stable blends. The catalyst is used in an amount of 0.01 to 1%, preferably 0.02 to 0.8%, the percents being relative to the weight of the components of the reactive blending.

The polycarbonate resins, including (co)polycarbonates and mixtures thereof, suitable in the second step of the inventive process, are known. Their structure and methods of preparation have been disclosed, for example, in U.S. Pat. Nos. 3,030,331; 3,169,121; 3,395,119; 3,729,447; 4,255,556; 4,260,731; 4,369,303 and 4,714,746, all of which are incorporated by reference herein.

The (co)polycarbonates generally have a weight average molecular weight of 10,000 to 200,000, preferably 20,000 to 80,000 and their melt flow rate, per ASTM D-1238 at 300° C., is about 1 to about 65 g/10 min., preferably about 2 to 15 g/10 min. They may be prepared, for example, by the known diphasic interface process from a carbonic acid derivative such as phosgene and dihydroxy compounds by polycondensation (see German Offenlegungsschriften 2,063,050; 2,063,052; 1,570,703; 2,211,956; 2,211,957 and 2,248,817; French Patent 1,561,518; and the monograph by H. Schnell, "Chemistry and Physics of Polycarbonates", Interscience Publishers, New York, N.Y., 1964, all incorporated herein by reference).

In the present context, dihydroxy compounds suitable for the preparation of the polycarbonates of the inventor conform to the structural formulae (1) or (2).

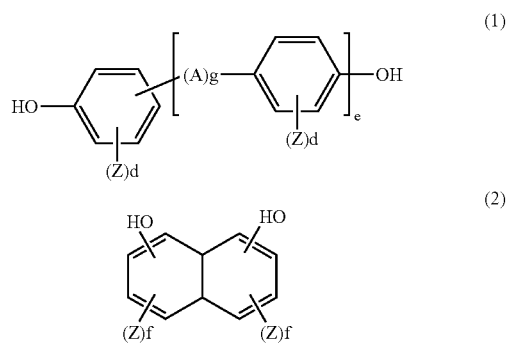

wherein
A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or —SO$_2$— or a radical conforming to

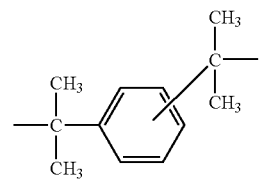

e and g both denote the number 0 to 1; Z denotes F, Cl, Br or C$_1$–C$_4$–alkyl and if several Z radicals are substituents in one aryl radical, they may be identical or different from one another; d denotes an integer of from 0 to 4; and f denotes an integer of from 0 to 3.

Among the dihydroxy compounds useful in the practice of the invention are hydroquinone, resorcinol, bis-(hydroxyphenyl)-alkanes, bis-(hydroxyphenyl)-ethers, bis-(hydroxyphenyl)-ketones, bis-(hydroxyphenyl)-sulfoxides, bis-(hydroxyphenyl)-sulfides, bis-(hydroxyphenyl)-sulfones, and α,α-bis-(hydroxyphenyl)-diisopropyl-benzenes, as well as their nuclear-alkylated compounds. These and further suitable aromatic dihydroxy compounds are described, for example, in U.S. Pat. Nos. 3,028,356; 2,999,835; 3,148,172; 2,991,273; 3,271,367; and 2,999,846, all incorporated herein by reference.

Further examples of suitable bisphenols are 2,2-bis-(4-hydroxy-phenyl)-propane (bisphenol A), 2,4-bis-(4-hydroxyphenyl)-2-methyl-butane, 1,1-bis-(4-hydroxyphenyl)-cyclohexane, α,α'-bis-(4-hydroxy-phenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)-sulfone, dihydroxy-benzophenone, 2,4-bis-(3,5-dimethyl-4-hydroxyphenyl)-cyclohexane, α,α'-bis-(3,5-dimethyl-4-hydroxyphenyl)-p-diisopropylbenzene and 4,4'-sulfonyl diphenol.

Examples of particularly preferred aromatic bisphenols are 2,2-bis-(4-hydroxyphenyl)-propane, 2,2-bis-(3,5-dimethyl-4-hydroxyphenyl)-propane and 1,1-bis-(4-hydroxyphenyl)-cyclohexane.

The most preferred bisphenol is 2,2-bis-(4-hydroxyphenyl)-propane (bisphenol A).

The polycarbonates of the invention may entail in their structure units derived from one or more of the suitable bisphenols.

Among the resins suitable in the practice of the invention are included phenolphthalein-based polycarbonates, copolycarbonates and terpolycarbonates such as are described in U.S. Pat. Nos. 3,036,036 and 4,210,741, both incorporated by reference herein.

The polycarbonates of the invention may also be branched by condensing therein small quantities, e.g., 0.05 to 2.0-mol % (relative to the bisphenols) of polyhydroxyl compounds.

Polycarbonates of this type have been described, for example, in German Offenlegungsschriften 1,570,533; 2,116,974 and 2,113,374; British Patents 885,442 and 1,079,821 and U.S. Pat. No. 3,544,514. The following are some examples of polyhydroxyl compounds which may be used for this purpose: phloroglucinol; 4,6-dimethyl-2,4,6-tri-(4-hydroxy-phenyl)-heptane; 1,3,5-tri-(4-hydroxphenyl)-benzene; 1,1,1-tri-(4-hydroxyphenyl)-ethane; tri-(4-hydroxyphenyl)-phenylmethane; 2,2-bis-[4,4-(4,4'-dihydroxydiphenyl)]-cyclohexyl-propane; 2,4-bis-(4-hydroxy-1-isopropyl-idine)-phenol; 2,6-bis-(2'-dihydroxy-5'-methylbenzyl)-4-methylphenol; 2,4-dihydroxy-benzoic acid; 2-(4-hydroxyphenyl)-2-(2,4-dihydroxyphenyl)-propane and 1,4-bis-(4,4'-dihydroxytriphenylmethyl)-benzene. Some of the other polyfunctional compounds are 2,4-dihydroxy-benzoic acid, trimesic acid, cyanuric chloride and 3,3-bis-(4-hydroxyphenyl)-2-oxo-2,3-dihydroindole.

In addition to the polycondensation process mentioned above, other processes for the preparation of the polycarbonates of the invention are polycondensation in a homogeneous phase and transesterification. The suitable processes are disclosed in the incorporated herein by references, U.S. Pat. Nos. 3,028,365; 2,999,846; 3,153,008; and 2,991,273.

The preferred process for the preparation of polycarbonates is the interfacial polycondensation process.

Other methods of synthesis in forming the polycarbonates of the invention such as disclosed in U.S. Pat. No. 3,912,688, incorporated herein by reference, may be used.

Suitable polycarbonate resins are available in commerce, for instance, Makrolon FCR, Makrolon 2600, Makrolon 2800 and Makrolon 3100, all of which are bisphenol based homopolycarbonate resins differing in terms of their respective molecular weights and characterized in that their melt flow indices (MFR) per ASTM D-1238 are about 16.5 to 24, 13 to 16, 7.5 to 13.0 and 3.5 to 6.5 g/10 min., respectively. These are products of Bayer Corporation of Pittsburgh, Pa.

The blending partner to be used in the preparation of the compatibilized blend of the invention include homopolymers and copolymers of vinyl monomers such as ethylene, propylene, butadiene, vinyl acetate, vinyl benzoate, vinyl isobutylether, acrylamide, methacrylamide, N-methoxy-methyl-methacrylamide, acrylonitrile, methacrylonitrile, acrylic acid esters and methacrylic esters, cyclohexyl-methacrylate, ethyl acrylate and butylacrylate, styrene, vinyl toluene, 2,4-dimethyl styrene, chlorostyrene and α-methyl styrene. Preferred are polystyrene, copolymers of styrene and acrylonitrile (SAN) as well as polyacrylates or methacrylates or graft copolymers such as ABS copolymers.

The reactive blending may be carried out continuously or in a batch. The resins and compatibilizer are mixed under temperature and time conditions to allow intimate mixing and permit the transesterification reaction to take place. Preferably, the temperature is in the order of 200 to 350° C., preferably 250 to 320° C. and the residence time is in the order of 1 second to 10 minutes, preferably 30 seconds to 3 minutes. An advantageous embodiment of the process may be carried out continuously in an extruder.

While not wishing to be bound to any particular: explanation of the mechanism of compatibilization, the inventor proposes that during extrusion, the hydroxyl group of the hydroxyl-containing vinyl based copolymer undergoes transesterification with the polycarbonate to form vinyl copolymers with polycarbonate grafts with the following formula:

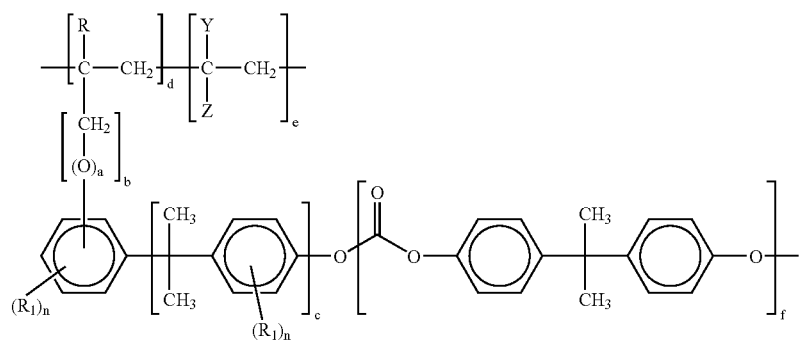

where a, b, c, d, e, n, R, $R_1$, Y, and Z are as described above and where f is greater than 1. The resulting blends show finer phase morphology and exhibit improved physical properties as compared to blends prepared without the compatibilizer.

The invention is further illustrated but is not intended to be limited by the following examples in which all parts and percentages are by weight unless otherwise specified.

EXAMPLES

1. The Preparation of a Hydroxyl-Containing Vinyl Copolymer Based on poly(styrene-co-acrylonitrile):

To a degassed solution of 153 g of styrene, 27.4 g of acrylonitrile, 5.4 g of α-methyl-p-hydroxystyrene, and 52 g of toluene was added 1.2 g of 2,2'-azobisisobutyronitrile.

The mixture was allowed to react for 8 hrs at 70° C. to yield a polymer with a Mn of 27,000. The hydroxy content of the resulting copolymer was 2 mol %.

Figure 2:
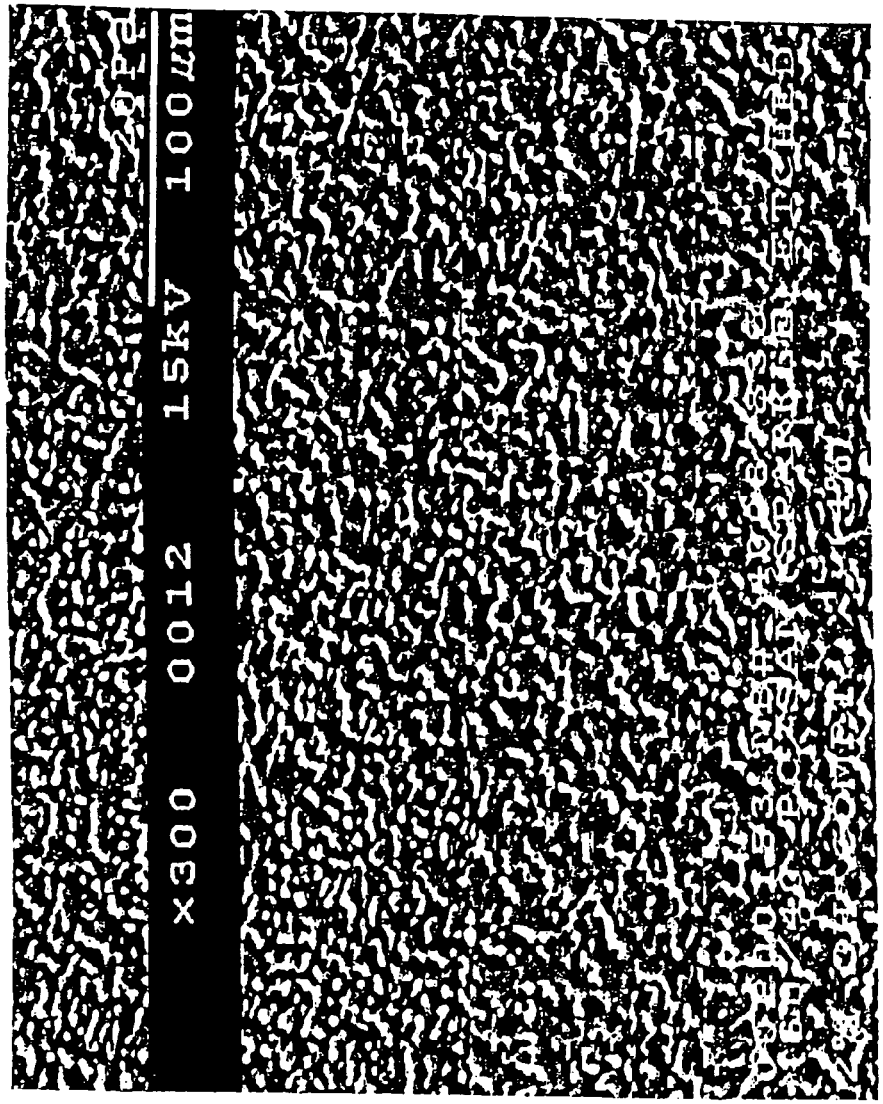
FIG. 2 is a scanning electron micrograph at 300 magnification of the inventive compatible blend containing 58% polycarbonate, 38% SAN and 4% of the inventive compatibilizer.

2. The Preparation of a Compatibilized Polycarbonate Blend with SAN:

Polycarbonate (58 wt. %), SAN (38 wt. %) and hydroxyl containing (2 mol %) SAN at 4 wt. % were melt mixed in a melt mixer at 300° C. 300 ppm of tetraphenylphosphonium benzoate was added to the melt. The resulting PC/SAN blend proved to be highly compatibilized as shown by FIG. 2.

The figure is an SEM micrograph of a sample of the compatibilized blend prepared in accordance with 2 that was microtomed and etched with a 30% NaOH solution. FIG. 1 shows a the SEM of a blend of 60% commercial grade bisphenol A polycarbonate and 40% commercial grade styrene/acrylonitrile copolymer (SAN) blended at 300° C. in a melt mixer.

3. Preparation of a Compatibilizer-Hydroxyl Containing Copolymer of poly(methyl methacrylate):

To a degassed solution of 1.37 g of α-methyl-p-hydroxystyrene (2 mol %) and 53.5 mL methyl methacrylate was added 0.312 g of a radical initiator, 2,2'-azobisisobutyronitrile. The mixture was allowed to react for 13 hrs at 70° C. to yield a suitable copolymeric compatibilizer.

4. Preparation of Compatibilized Blend of Polycarbonate with PMMA:

Polycarbonate (93%), PMMA (5%), and the copolymeric compatibilizer prepared in 3 above (2% mole—OH, 2% wt.) were melt mixed in a melt mixer at 280° C. Once the material had melted, 200 ppm of tetraphenylphosphonium benzoate was added. A compatibilized blend resulted.

5. The Preparation of a Compatible Polycarbonate Blends with SAN:

Compatible blends of polycarbonate and styrene/acrylonitrile (SAN) were prepared and their properties determined. The polycarbonate used in the experiments was a linear aromatic homopolycarbonate resin based bisphenol-A and having a melt index of 11.5 g/10 min at 300° C. with a 1.2 kg load.

The SAN contained 83 wt. % styrene and 17 wt. % acrylonitrile, having a melt index of 12 g/10 min at 230° C. with a 3.2 kg load.

The compatibilizer was the terpolymer of styrene, acrylonitrile, and α-methyl-p-hydroxystyrene, the preparation of which has been described in 1 above.

The reactive blending of the exemplified blends was catalyzed by tetraphenylphosphonium benzoate (300 ppm).

The components were initially physically blended, then fed into a Prism 16 mm co-rotating twin screw extruder (L:D=25:1) and 100 RPM and a melt temperature of 280° C. and a die temperature of 280° C. The extruded strand was passed through a water bath and pelletized. The pellets were then dried and injection molded into test specimens.

The table below shows the effect of the addition of the compatibilizer to PC/SAN blends. The addition of 1 wt. % of the compatibilizer shows an increase in the VICAT softening temperature of the resulting blend. The compatibilized blend also showed improved flexural modulus at a loading of 2 wt. % of the compatibilizer.

|  | Control | 1 | 2 | 3 | 4 |
|---|---|---|---|---|---|
| Polycarbonate | 60 | 59 | 59 | 58 | 57 |
| SAN | 40 | 40 | 39 | 39 | 38 |

-continued

|  | Control | 1 | 2 | 3 | 4 |
|---|---|---|---|---|---|
| Compatibilizer | 0 | 1 | 2 | 3 | 5 |
| VICAT (° C.) | 116 | 120 | 118 | 117 | 117 |
| Flexural Modulus (gPa 0.125") | 2.99 | 2.98 | 3.07 | 3.02 | 3.04 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process of making a compatible thermoplastic molding composition comprising reactive blending, in the melt and in the presence of a transesterification catalyst, a polycarbonate, a vinyl (co)polymer and a hydroxy-containing compatibilizer that is the polymerized reaction product of (a) and (b) wherein
   (a) is at least one vinyl monomer that contains no hydroxy groups and where
   (b) is a hydroxyl containing monomer conforming to (I)

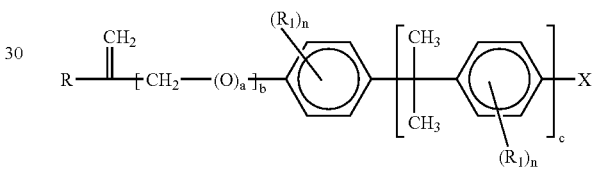

where R denotes H or $C_1$–$C_4$ alkyl, $R_1$ denotes H, Cl, Br, $C_1$–$C_4$ alkyl, cyclohexyl, or $C_1$–$C_4$ alkoxy, a is 0 or 1, b is 0 or 1, c is 0 or 1, n is an integer of 0 to 4, and X is an OH group, and wherein vinyl (co)polymer is selected from the group consisting of SAN, ABS, homopolyolefin, homopolymethacrylate, homopolyacrylate and homopolystyrene.

2. The process of claim 1 wherein the compatibilizer has a weight average molecular weight of 5,000 to 80,000.

3. The process of claim 1 wherein 2.0 to 5% of (b) is reacted with (a), the percent being relative to the total weight of (a) and (b).

4. The process of claim 1 wherein vinyl (co)polymer is a homopolymer of a monomer selected from the group consisting of ethylene, propylene, butadiene, vinyl acetate, vinyl benzoate, vinyl isobutylether, acrylamide, methacrylamide, N-methoxy-methyl-methacrylamide, acrylonitrile, methacrylonitrile, acrylic acid ester, methacrylic ester, cyclohexylmethacrylate, styrene and vinyl toluene.

5. The process of claim 1 wherein (b) is at least one member selected from the group consisting of α-methyl-p-hydroxy-styrene, p-hydroxystyrene, and p-isopropenyl-o-cresol.

6. The process of claim 1 wherein (a) is at least one member selected from the group consisting of styrene, acrylonitrile, acrylate and olefin monomers.

7. The process of claim 1 wherein compatibilizer is the reaction product of (a) and 0.5 to 50 percent of (b) the percent being relative to the total weight of (a) and (b).

8. The compatible thermoplastic molding composition prepared by the process of claim 1.

* * * * *